United States Patent [19]

Ijtsma

[11] Patent Number: 5,715,312

[45] Date of Patent: Feb. 3, 1998

[54] CONCEALMENT METHOD AND ARRANGEMENT AND REPRODUCING APPARATUS PROVIDED WITH THE CONCEALMENT ARRANGEMENT

[75] Inventor: Pope Ijtsma, Eindhoven, Netherlands

[73] Assignee: U.S. Philips Corporation, New York, N.Y.

[21] Appl. No.: 625,955

[22] Filed: Apr. 1, 1996

[30] Foreign Application Priority Data

Apr. 21, 1995 [EP] European Pat. Off. ............ 95201020.5

[51] Int. Cl.$^6$ .................................................. H04N 7/167
[52] U.S. Cl. ...................... 380/3; 380/9; 380/20
[58] Field of Search ........................... 380/9, 20, 5, 3, 380/4

[56] References Cited

U.S. PATENT DOCUMENTS

| | | | |
|---|---|---|---|
| 5,163,136 | 11/1992 | Richmond | 395/275 |
| 5,323,396 | 6/1994 | Lokhoff | 370/94.1 |
| 5,359,468 | 10/1994 | Rhodes et al. | 360/48 |

Primary Examiner—David C. Cain
Attorney, Agent, or Firm—Michael E. Belk

[57] ABSTRACT

Arrangement for carrying out a concealment on an information signal, the information signal including subsequent signal blocks (padding sequence), each signal block including a sequence of alternate first frames and second frames of different lengths, expressed in numbers of bits, the number of first frames and second frames in a signal block being N1 and N1-1 respectively. The last frame in a signal block and the first frame in a subsequent signal block are a first frame. The arrangement includes an input terminal for receiving the information signal, a concealment unit having an input coupled to the input terminal and an output coupled to an output terminal for supplying the concealed information signal. The concealment unit is adapted to conceal the information in response to a concealment control signal. More specifically, the concealment unit is adapted to conceal a number of M subsequent frames, M being an odd integer smaller than 2.N1-1. The concealment unit includes a memory for storing M+1 subsequent frames directly preceding the M subsequent frames to be concealed. For various situations, concealment is realized by appropriately generating frames for replacing the frames to be concealed, using the frames stored in the memory.

20 Claims, 8 Drawing Sheets

CONCEALMENT METHOD AND ARRANGEMENT AND REPRODUCING APPARATUS PROVIDED WITH THE CONCEALMENT ARRANGEMENT

BACKGROUND OF THE INVENTION

The invention relates to an arrangement for carrying out a concealment on an information signal, the information signal comprising subsequent signal blocks, each signal block comprising a sequence of alternate first frames and second frames of different lengths, expressed in numbers of bits, the number of first frames and second frames in a signal block being N1 and N1−1 respectively, where N1 is an integer number, the arrangement comprising an input terminal for receiving the information signal, concealment means having an input coupled to the input terminal and an output which is coupled to an output terminal for supplying the concealed information signal, the concealment means being adapted to conceal the information in response to a concealment control signal, a concealment method and a reproducing apparatus provided with the concealment arrangement.

U.S. Pat. No. 5,323,396 discloses a digital transmission system for transmitting via a transmission medium and receiving from said transmission medium, a wideband digital signal having a sampling frequency $F_s$, for example a digital audio signal. The transmitter in this transmission system is adapted to generate a converted signal in which the digital signal is included for transmission. The converted signal comprises subsequent frames, each frame being built up of a number of information packets, each information packet comprising N bits of information, where N is larger than 1. The number of packets B in the frames have a relationship to a parameter P, which parameter satisfies the following relationship:

$$P = BR.n_s/N.F_s,$$

where BR is the bitrate of the converted signal and $n_s$ equals the number of samples of the wideband digital signal that has been stored in one frame of the converted signal. If the above relationship results in a value for the parameter P which is integer, the number of packets B in the frames equals P. If, however, the value for the parameter P is non-integer, the transmitter generates subsequent groups of frames, called a padding sequence. A first number of frames in the groups of frames (padding sequence) comprise P' packets and the other frames in the groups of frames comprise P'+1 packets, where P' is the largest integer value which is smaller than P. The first number of frames in the groups of frames is chosen such that the average frame rate of the converted signal is substantially equal to $F_s/n_s$.

The U.S. patent gives for a number of bitrates BR, in a situation where $F_s = 44.1$ kHz and N=32, the length of the padding sequence and the number of frames in a padding sequence having one packet (slot) more than the other frames in the sequence, see the FIGS. 5 and 6 in the patent and the corresponding description. More specifically, for a situation where BR=384 kb/s, the padding sequence is 49 frames, in which 24 frames have 105 packets and 25 frames in the sequence have 104 packets.

FIG. 1 shows the serial datastream of the converted signal, as included in a padding sequence. The 49 frames in a padding sequence are denoted by $F_0$ to $F_{48}$. The even numbered frames in the padding sequence are 104 packets of 32 bits long and the odd numbered frames in the padding sequence are 105 packets long, so that 24 frames having 105 packets and 25 frames having 104 packets are included in a padding sequence. The number of packets included in a frame is indicated in FIG. 1 below the frame in question.

The U.S. patent further discloses the transmission of the converted signal by recording of the converted signal in tracks on a longitudinal record carrier. Generally, for recording the converted signal in tracks on the record carrier, some error correction encoding (such as a Reed Solom encoding) and some channel encoding (such as an 8-to-10 modulation) must be carried out on the converted signal so as to obtain a channel signal which is suitable for recording on a record carrier.

Upon reproduction, the information read from the record carrier is channel decoded (such as by carrying out a 10-to-8 demodulation) and an error correction is carried out in an error correction decoder so as to correct for errors in the read out information, resulting in a regenerated converted signal.

SUMMARY OF THE INVENTION

The invention aims at providing a concealment on the signal read out if error correction fails. The arrangement in accordance with the invention is characterized in that the concealment means are adapted to conceal a number of M subsequent frames, M being an odd integer smaller than 2.N1−1, the concealment means comprising memory means for storing M+1 subsequent frames directly preceding the M subsequent frames to be concealed, that, in a situation where the M subsequent frames to be concealed comprise the last frame of a signal block and the first frame of a subsequent signal block, the concealment means are adapted to replace the M frames to be concealed by a group of M subsequent frames stored in the memory means, the said group of M subsequent frames used for replacement starting with a first frame.

The arrangement may be further characterized in that in said situation where the M subsequent frames to be concealed comprise the last frame of a signal block and the first frame of a subsequent signal block, and where the M subband frames to be concealed start with a second frame, the concealment means are adapted to replace the M frames to be concealed by a group of M−1 subsequent frames stored in the memory means, plus one of the first frames stored in the memory, the group of M−1 subsequent frames used for replacement starting with a second frame.

The invention is based on the recognition that drop-outs may occur during read-out of information from the record carrier. As a result, the information read out may become uncorrectable in the error correction decoder. In accordance with the invention, the uncorrectable portion of the signal read out is replaced by a portion read out earlier, which appeared to be correct, or was concealed earlier.

The arrangement may be further characterized in that, in a second situation where the M+1 subsequent frames stored in the memory means comprise the last frame of a signal block and the first frame of a subsequent signal block, the concealment means are adapted to replace the M frames to be concealed by a group of M subsequent frames stored in the memory means, if the M subsequent frames to be concealed comprise (M+1)/2 first frames and (M−1)/2 second frames, and in that in said second situation where the M+1 subsequent frames stored in the memory means comprise the last frame of a signal block and the first frame of a subsequent signal block, the concealment means are adapted to replace the M frames to be concealed by a group of M−1 subsequent frames stored in the memory means, plus one of the second frames stored in the memory, if the M subsequent frames to be concealed comprise (M−1)/2 first frames and (M+1)/2 second frames, the group of M−1 subsequent frames used for replacement starting with a second frame. Further, the arrangement may be characterized in that, in a third situation where neither the M subsequent frames to be concealed nor the M+1 subsequent frames stored in the memory means comprise both the last frame of a signal block and the first frame of a subsequent signal block, the concealment means are adapted to replace the M frames to be concealed by (i) a group of M subsequent frames stored in the memory means, if the M subsequent frames to be concealed comprise (M+1)/2 first frames and (M−1)/2 second frames, the group of the M subsequent frames used for replacement starting with a first frame, and by (ii) a group of M subsequent frames stored in the memory means, if the M subsequent frames to be concealed comprise (M−1)/2 first frames and (M+1)/2 second frames, the group of M subsequent frames used for replacement starting with a second frame. Because of the specific nature of the information signal is necessary to distinguish between various situations that may occur when a concealment must be carried out.

BRIEF DESCRIPTION OF THE DRAWINGS

These and other aspects of the invention will be apparent from and elucidated with reference to the embodiments described hereafter in conjunction with the drawings, in which.

DESCRIPTION OF THE PREFERRED EMBODIMENTS

Figure 2:
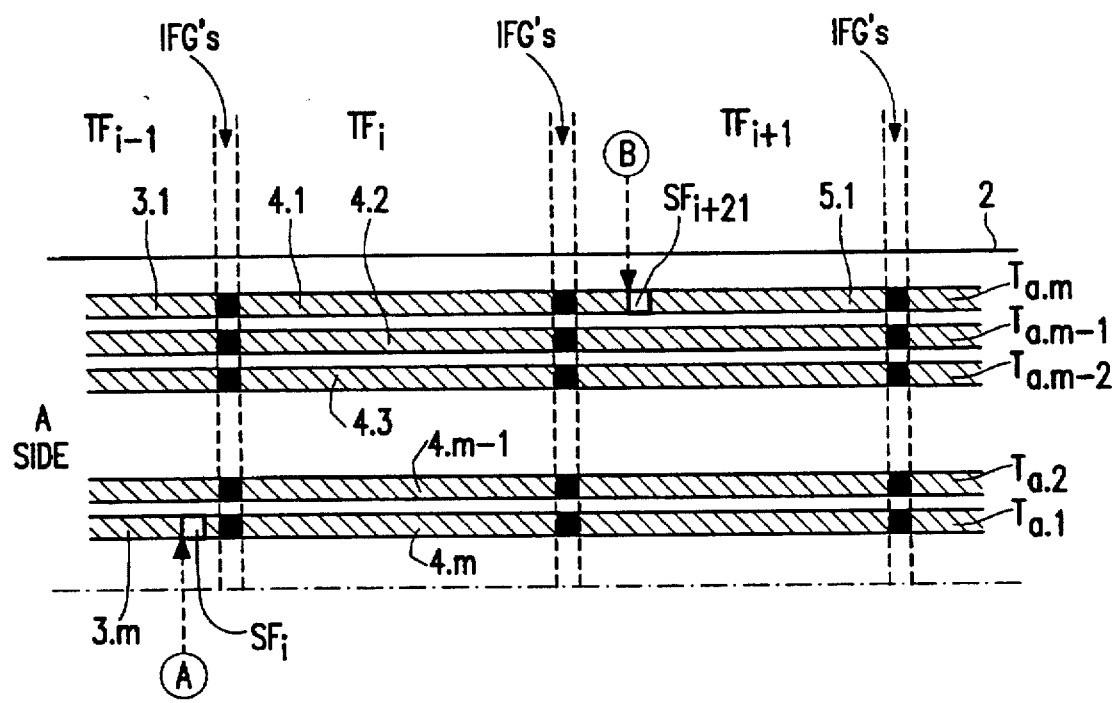
FIG. 2 shows part of a record carrier on which tracks having information recorded in it are located.

FIG. 2 shows a longitudinal record carrier 2 in which a number of m parallel tracks $T_{a,1}$ to $T_{a,m}$ are located on the A-side of the record carrier. FIG. 2 shows only one half, namely the A-side, of the record carrier 2. The tracks are divided into track parts by means of interframe gaps IFG, indicated by the double hatched parts in the tracks between the track parts. The track parts in the tracks $T_{a,1}$ to $T_{a,m}$ that lie adjacent each other on the record carrier 2 form a tape frame. FIG. 2 shows a number of tape frames ..., $TF_{i-1}$, $TF_i$, $TF_{i+1}$, ... located after each other on the record carrier 2.

The serial datastream of the converted signal, after having been subjected to the channel encoding step mentioned above, is stored in a tapeframe $TF_i$ on the record carrier in such a way that a first signal part of the serial datastream is stored in the track part 4.1 in the track $T_{a,m}$, a second signal part of the serial datastream, following the first signal part, is stored in the track part 4.2 in the track $T_{a,m-1}$, the third signal part of the serial datastream, following the second signal part, is stored in the track part 4.3 in the track $T_{a,m-2}$. This is continued until a signal part of the serial datastream is stored in the track part 4.m in the track $T_{a,1}$. The next signal part, following the signal part stored in the track part 4.m, is stored in the following tape frame, more specifically stored in the track part 5.1 in the track $T_{a,m}$.

It should be noted in this respect that the total storage capacity of a tape frame is such that an information content of a non integer number of the frames F, having either 104 or 105 packets, can be included in a tape frame $TF_i$, after channel encoding. As an example, a tape frame $TF_i$ can include an information content corresponding to the information included in more than 20 and less than 21 frames $F_i$, as included in a padding sequence. So, if it is assumed that a frame $F_i$ in the padding sequence is stored across the boundary between the tape frames $TF_{i-1}$ and $TF_i$, then a frame sync word $SF_i$, being the first element in a frame $F_i$ is stored in the tape frame $TF_{i-1}$, more specifically in the track part 3.m of the track $T_{a,1}$. Next, the remaining portion of the track part 3.m of the tape frame $TF_{i-1}$ is filled and the remaining information content of the frame $F_i$ is stored in the tape frame $TF_i$, more specifically in the start portion of the track part 4.1 in the track $T_{a,m}$. Subsequent frames $F_{i+1}$, $F_{i+2}$, ... in the padding sequence are stored in the track part 4.1, until the track part 4.1 is filled. Subsequent frames are stored in the subsequent track parts 4.2, 4.3, ... until the last track part 4.m in the tape frame $TF_i$ is filled. The frame $F_{i+20}$ is stored across the boundary of the tape frames $TF_i$ and $TF_{i+1}$. As a result, a start portion of the frame $F_{i+20}$ is stored in the last portion of the track part 4.m, and the remaining portion of the frame Fi+20 is stored in start portion of the track part 5.1. Next follows the sync frame word $SF_{i+21}$ of the frame $F_{i+21}$, which is stored in the track part 5.1.

It should be noted that the information is recorded in the track parts 4.1 to 4.m by means of m corresponding recording heads at the same time. That means that the information that has to be recorded in the tape frame $TF_i$ is arranged in a memory, prior to recording, in such a way that m serial datastreams are generated, which m datastreams are supplied to each one of the m recording heads for recording of the datastreams in the m tracks at the same time.

As already explained above, upon reproduction, the information read from the record carrier is channel decoded (such as by carrying out a 10-to-8 demodulation) and an error correction is carried out in an error correction decoder so as to correct for errors in the read out information, resulting in a regenerated converted signal. However, drop-outs can occur, such that a tape frame read out is uncorrectable in the error correction decoder. That means that a gap to a length of 21 frames occurs in the datastream of the regenerated converted signal.

Figure 3:
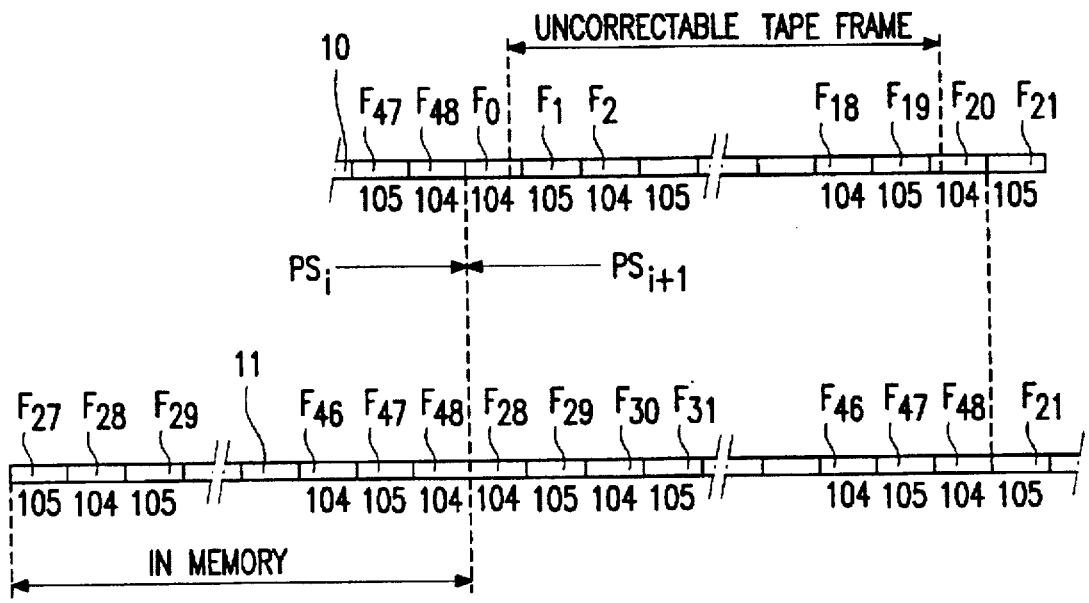
FIGS. 3 to 9, 9a, 10 to 12, 12a and 13, show various situations of concealment of M subsequent frames in the information signal.

In accordance with the present invention, an error concealment is carried out. This error concealment is explained below. The error concealment is based on the measure to fill the gap by using 21 previous frames that have been reproduced correctly. FIG. 3 shows schematically the serial datastream of the subsequent frames, denoted by the reference numeral 10, read from the record carrier. FIG. 3 shows the last two frames $F_{47}$ and $F_{48}$ of a padding sequence $PS_i$ and the frames $F_0$ to $F_{21}$ of the next padding sequence $PS_{i+1}$. It is assumed that the frames $F_0$ to $F_{20}$ of the padding sequence $PS_{i+1}$ are stored in a tape frame, which upon reproduction appears to be uncorrectable, and that the previous tape frame appeared to be correctable. A memory (not shown) is present in which a number of 22 directly preceding frames are stored. In the present situation, the frames $F_{27}$ to $F_{48}$ of the padding sequence $PS_i$ are stored in the memory. The 21 frames $F_0$ to $F_{20}$ of the padding sequence $PS_{i+1}$ are now replaced by 21 frames from the frames stored in the memory. Those are the frames $F_{28}$ to $F_{48}$ of the padding sequence $PS_i$. As can be seen in FIG. 3, the serial datastream denoted by the reference numeral 11 is the concealed serial datastream that is regenerated upon reproduction.

The gap, occurring because of the uncorrectable tape frame has been filled precisely with the same number of packets, as was originally included in the serial datastream. As a result, the reproduction circuit remains synchronized and listening tests have revealed that, after reconversion of the regenerated converted signal into an audio signal, the concealment is unaudible.

Figure 4:
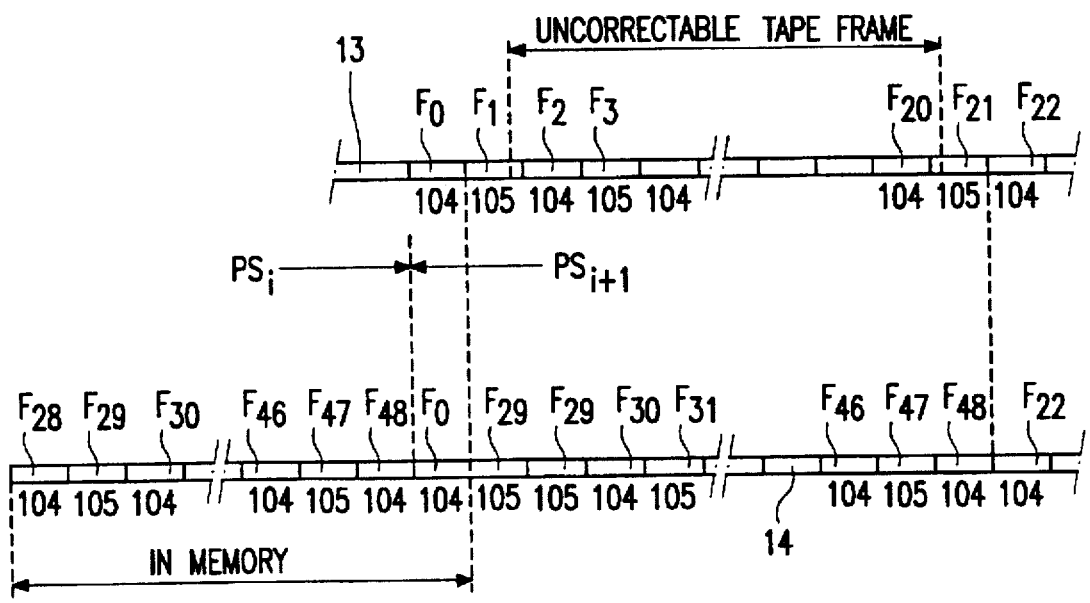

FIG. 4 shows the same situation as in FIG. 3, however shifted over one frame to the left. The frames $F_1$ to $F_{21}$ of the padding sequence $PS_i$ are now included partly or wholly in the uncorrectable tape frame, and the memory has the frames $F_{28}$ to $F_{48}$ of the previous padding sequence $PS_i$ and the frame $F_0$ of the present padding sequence stored in it. Concealment is now realized by replacing the 21 frames $F_1$ to $F_{21}$ of the padding sequence $PS_{i+1}$ by the frames $F_{29}$, which is moreover repeated once, and the frames $F_{30}$ to $F_{48}$, that is again 21 frames of the previous padding sequence. The repetition of a frame having 105 packets (in the present situation the frame $F_{29}$) is needed in order to obtain the correct total number of packets that fill the gap, as the memory contains now two successive frames $F_{48}$ and $F_0$ having 104 packets. The original serial datastream is indicated in FIG. 4 by the reference numeral 13 and the regenerated serial datastream is indicated by the reference numeral 14.

Figure 5:
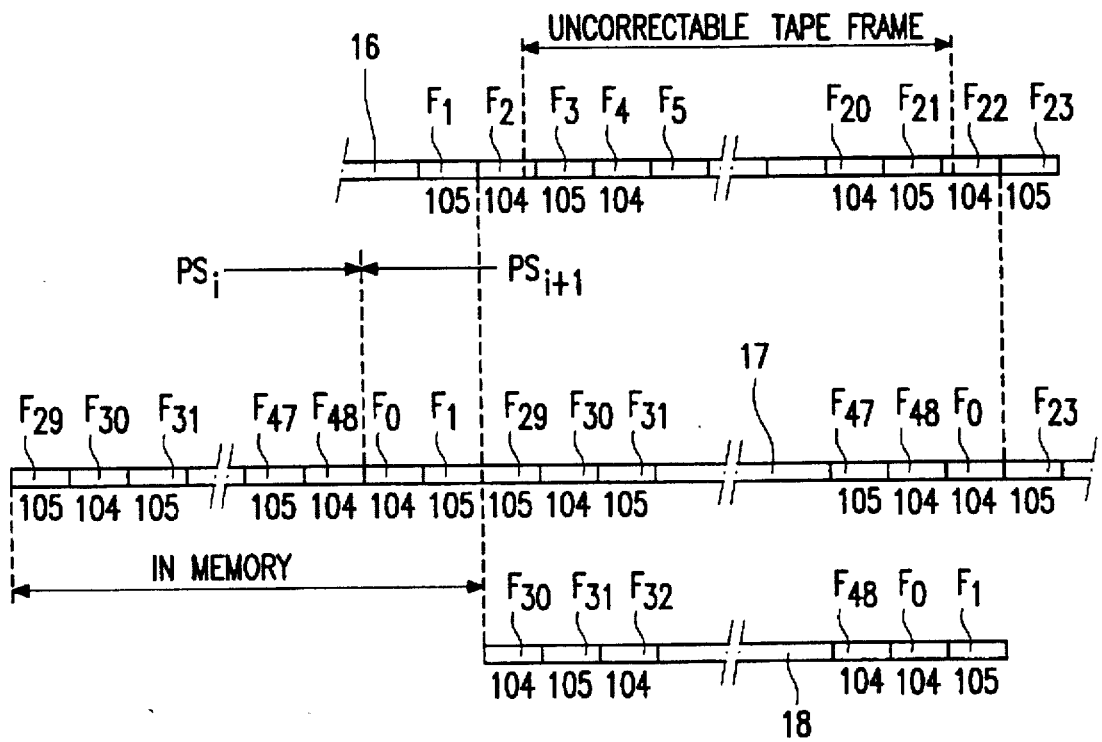

FIG. 5 shows the situation of FIG. 4, however shifted over one frame to the left. The original datastream is given by reference numeral 16. The frames $F_2$ to $F_{22}$ of the padding sequence $PS_i$ are now included partly or wholly in the uncorrectable tape frame, and the memory has the frames $F_{29}$ to $F_{48}$ of the previous padding sequence $PS_i$ and the frames $F_0$ and $F_1$ of the present padding sequence stored in it. Concealment can now be realized in different ways. In a first embodiment, the concealment is realized by replacing the 21 frames $F_2$ to $F_{22}$ of the padding sequence $PS_{i+1}$ by the frames $F_{29}$ to $F_0$ stored in the memory. This results in the serial datastream indicated by the reference numeral 17. The correct number of packets have been generated in this way to fill the gap. The boundary between the frame $F_1$ of the original signal and the frame $F_{29}$, being the first frame of the replacing signal, results in two frames having 105 packets lying side by side. This is however compensated for by the fact that the frames $F_{48}$ and $F_0$ in the replacing signal have both 104 packets.

In a second embodiment, the frames $F_{30}$ to $F_1$ from the memory are used for the replacing signal, see the reference numeral 18. It is clear that again the correct number of packets are used for filling the gap.

Figure 6:
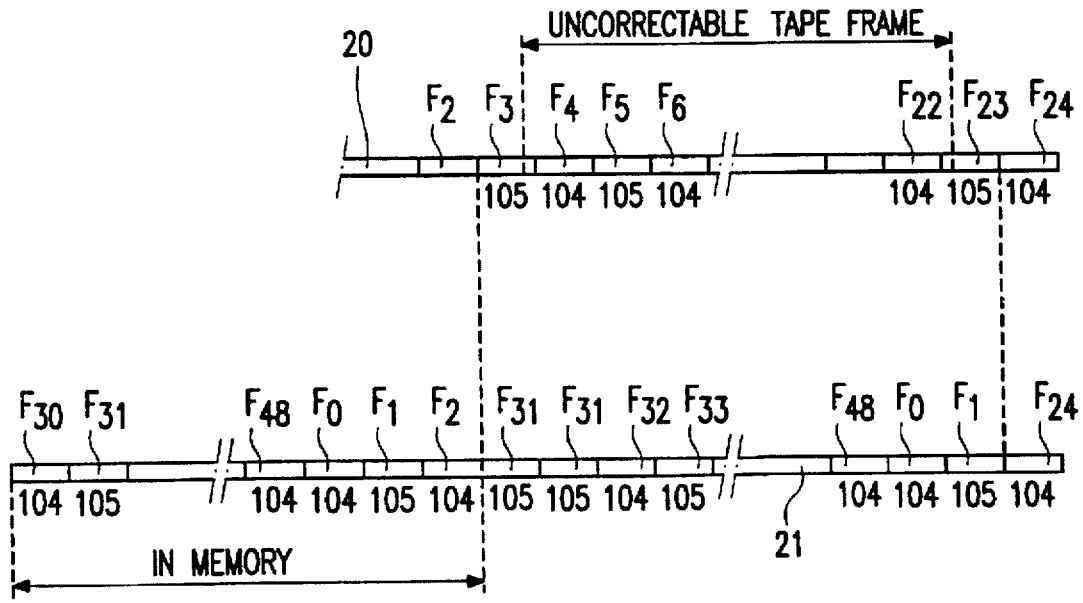

FIG. 6 shows the situation of FIG. 5, again shifted over one frame to the left. The original datastream is given by reference numeral 20 and the concealed datastream by the reference numeral 21. The frames $F_3$ to $F_{23}$ of the padding sequence $PS_i$ are now included partly or wholly in the uncorrectable tape frame, and the memory has the frames $F_{30}$ to $F_{48}$ of the previous padding sequence $PS_i$ and the frames $F_0$ to $F_2$ of the present padding sequence stored in it. Concealment can now be realized by replacing the 21 frames $F_3$ to $F_{23}$ of the padding sequence $PS_{i+1}$ by the frames $F_{31}$ to $F_1$ stored in the memory, where the frame $F_{31}$ in the present example is repeated once. This results in the serial datastream 21. The correct number of packets have been generated in this way to fall the gap.

Figure 7:
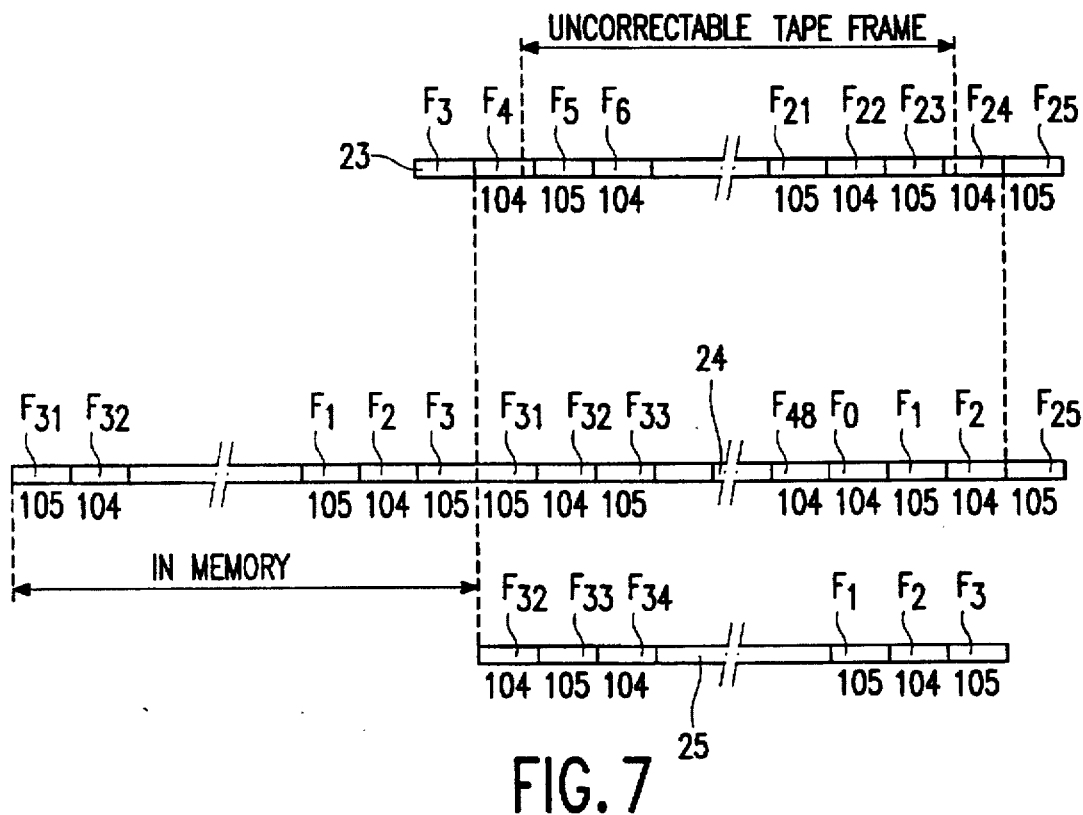

FIG. 7 shows the situation of FIG. 6, again shifted over one frame to the left. The original datastream is given by reference numeral 23. The frames $F_4$ to $F_{24}$ of the padding sequence $PS_i$ are now included partly or wholly in the uncorrectable tape frame, and the memory has the frames $F_{31}$ to $F_{48}$ of the previous padding sequence $PS_i$ and the frames $F_0$ to $F_3$ of the present padding sequence stored in it. Concealment can now be realized in different ways. In a first embodiment, the concealment is realized by replacing the 21 frames $F_4$ to $F_{24}$ of the padding sequence $PS_{i+1}$ by the frames $F_{31}$ to $F_2$ stored in the memory. This results in the serial datastream indicated by the reference numeral 24. The correct number of packets have been generated in this way to fall the gap. The boundary between the frame $F_3$ of the original signal and the frame $F_{31}$, being the first frame of the replacing signal, results in two frames having 105 packets lying side by side. This is however compensated for by the fact that the frames $F_{48}$ and $F_0$ in the replacing signal have both 104 packets.

In a second embodiment, the frames $F_{32}$ to $F_3$ from the memory are used for the replacing signal, see the reference numeral 25. It is clear that again the correct number of packets are used for filling the gap.

From the foregoing, it is clear that in a situation where the first frame of the 21 frames to be replaced is an odd numbered frame, one frame having 105 packets must be repeated and, where the first frame of the 21 frames to be replaced is an even numbered frame, one can take 21 subsequent frames from the 22 frames stored in the memory.

The next situation that will be described, is the situation where the memory contains the frame $F_{48}$ of the padding sequence $PS_i$ and the frames $F_0$ to $F_{20}$ of the padding sequence $PS_{i+1}$, see the FIG. 8. The original datastream is denoted by the reference numeral 27 and the corrected datastream by the reference numeral 29. The uncorrectable tapeframe now comprises, partly or wholly, the frames $F_{21}$ to $F_{41}$ of the padding sequence $PS_{i+1}$. Those frames are replaced by the-frames $F_0$ to $F_{19}$ stored in the memory, where the frame $F_1$ is copied once, so as to make the number of packets equal to the number of packets in the lost frames $F_{21}$ to $F_{41}$ of the padding sequence $PS_{i+1}$.

Figure 8:
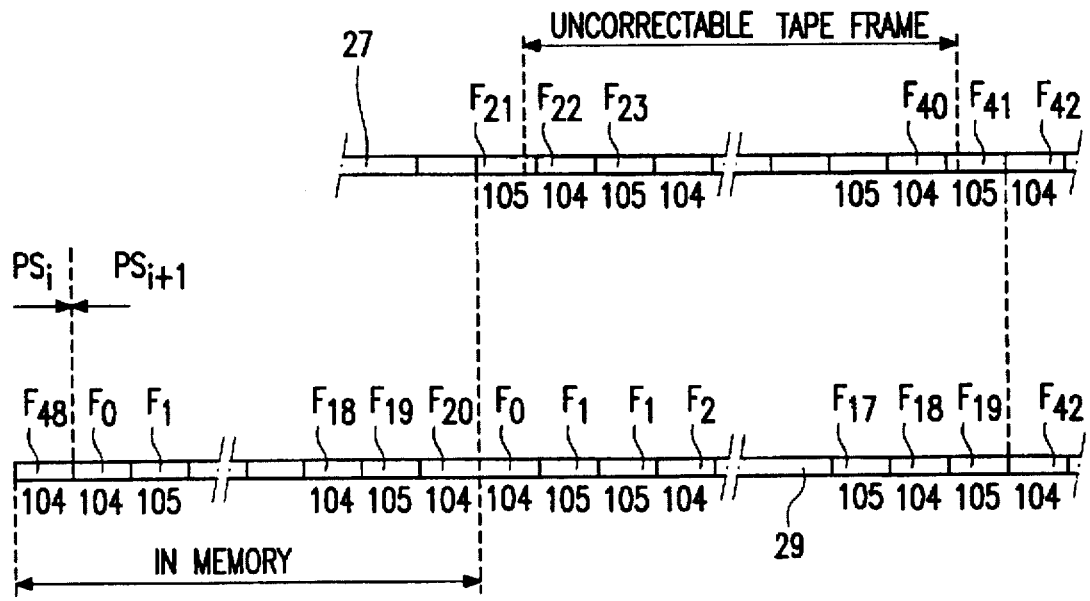
Figure 9:
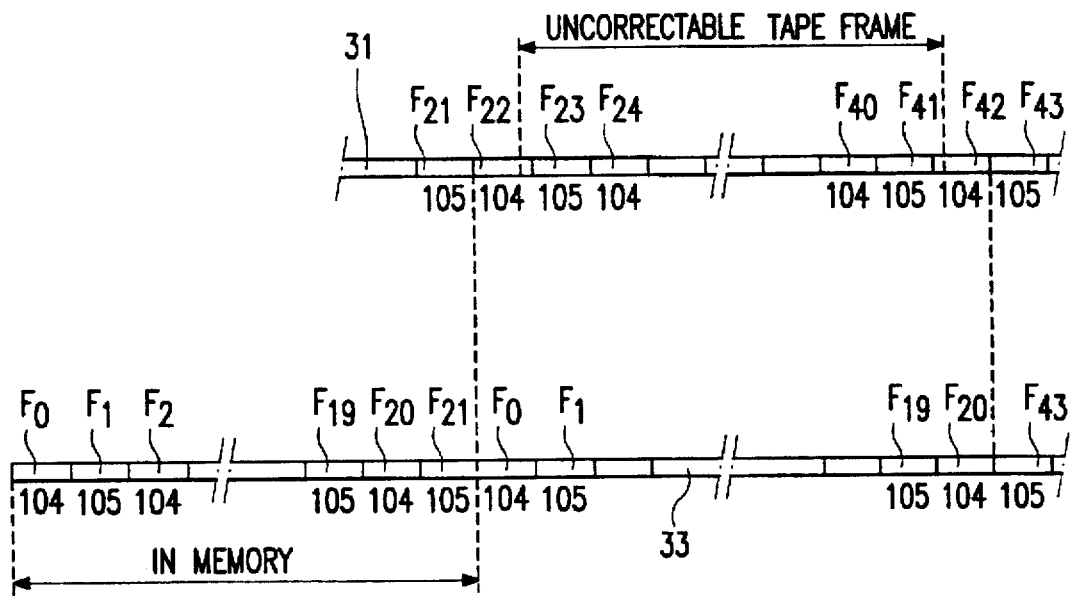

FIG. 9 shows the situation of FIG. 8, however shifted over one frame to the left. The original datastream is given by reference numeral 31. The frames $F_{22}$ to $F_{42}$ of the padding sequence $PS_{i+1}$ are now included partly or wholly in the uncorrectable tape frame, and the memory has the frames $F_0$ to $F_{21}$ of the padding sequence $PS_{i+1}$ stored in it. Concealment is now be realized by replacing the 21 frames $F_{22}$ to $F_{42}$ of the padding sequence $PS_{i+1}$ by the frames $F_0$ to $F_{20}$ stored in the memory. This results in the serial datastream indicated by the reference numeral 33. The correct number of packets have been generated in this way to fill the gap.

Figure 9A:
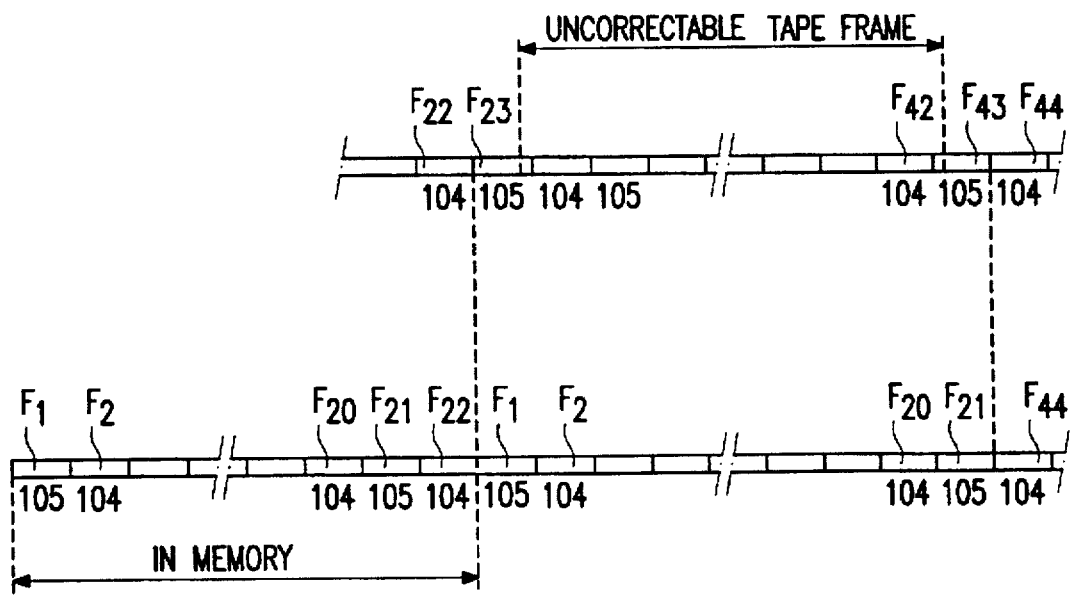
Figure 10:
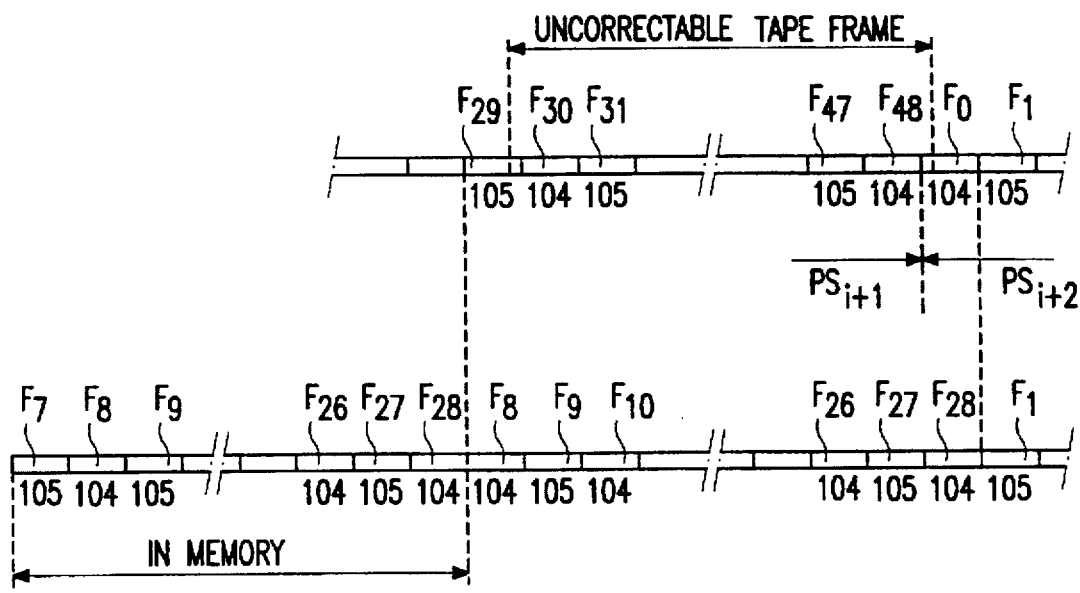

It will be clear that for each shift over one frame to the left, always the first 21 frames in the memory can be used to fill the gap, see also FIG. 9a. This is true for those number of shifts to the left until the first frame of the next padding sequence $PS_{i+2}$ lies (partly) within the uncorrectable frame, as shown in FIG. 10. As can be seen in FIG. 10, the gap formed by the lost frames $F_{29}$ to $F_{48}$ of the padding sequence $PS_{i+1}$ and the frame $F_0$ of the padding sequence $PS_{i+2}$ is now filled by the last 21 frames $F_8$ to $F_{28}$ stored in the memory.

Figure 11:
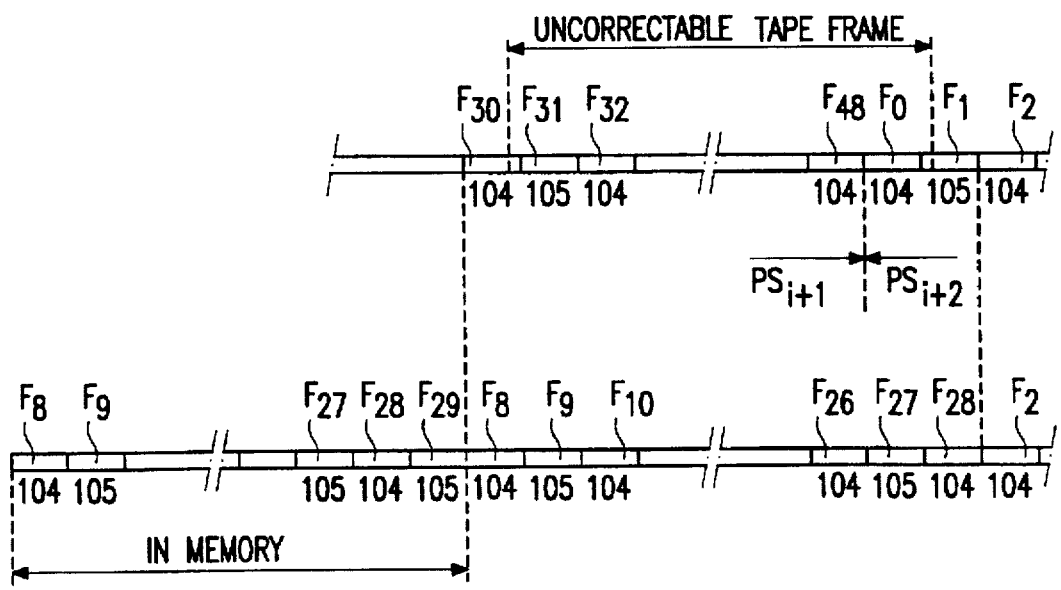
Figure 12:
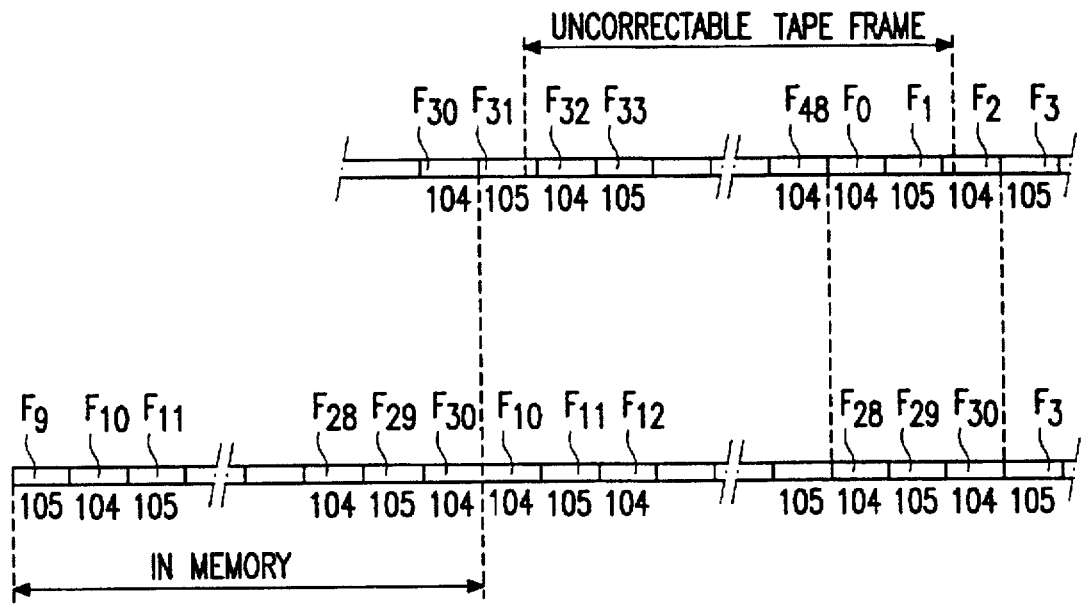

Again a shift over one frame later, see FIG. 11, the same 21 frames $F_8$ to $F_{28}$, that is the first 21 frames in the memory, can be used to fill the gap. Again a shift over one frame later, see FIG. 12, the frames $F_{10}$ to $F_{30}$, that is the last 21 frames stored in the memory, are used to fill the gap resulting from the uncorrectable tapeframe.

Figure 13:
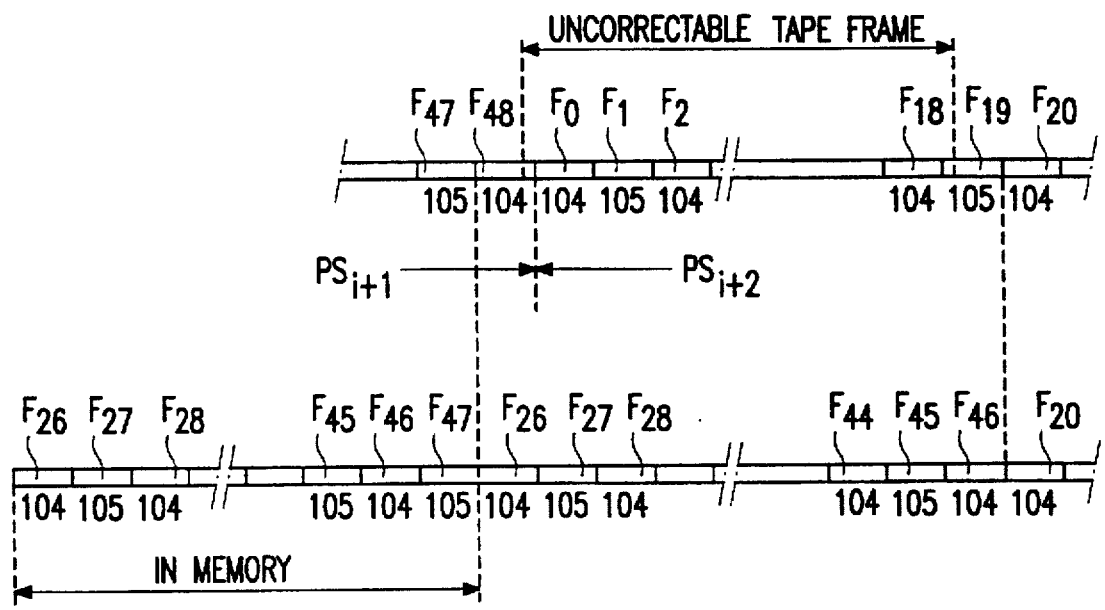

This is continued for further shifts over one frame to the left, until the situation of FIG. 13, where the uncorrectable tapeframe comprises wholly or in part the frame $F_{48}$ of the padding sequence $PS_{i+1}$ and the frames $F_0$ to $F_{19}$ of the padding sequence $PS_{i+2}$. Those lost frames are replaced by the frames $F_{26}$ to $F_{46}$ stored in the memory. The next shift over one frame results in the situation described above with reference to FIG. 3.

Figure 12A:
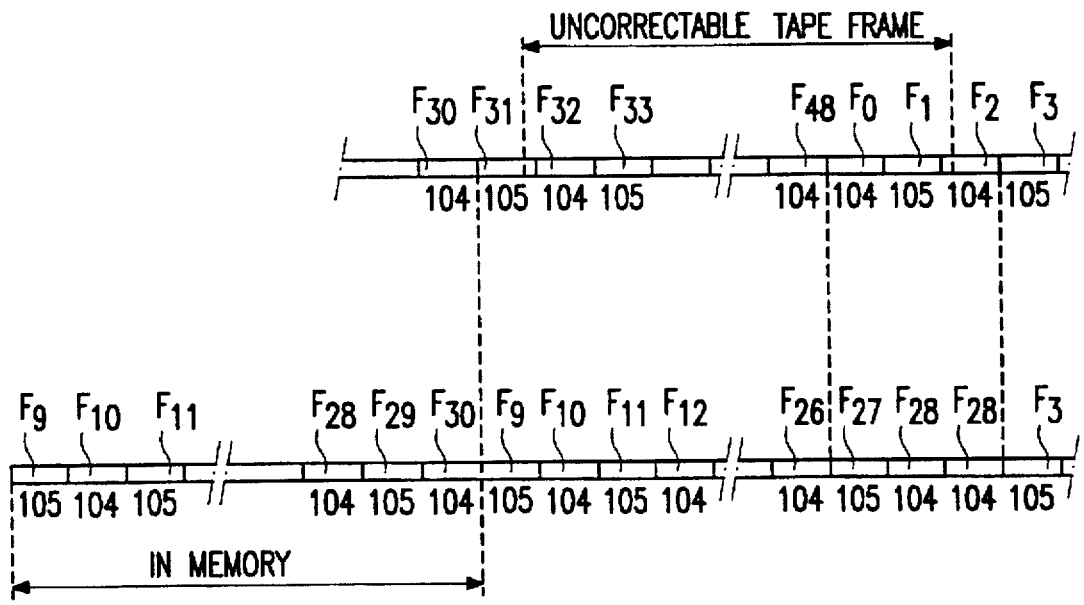

FIG. 12a shows another way of replacing the contents of the uncorrectable tape frame by correct information stored in the memory. In this case, the frames $F_9$ to $F_{28}$ are used and the frame $F_{28}$ is copied once so as to obtain the number of frames required for replacing the uncorrectable tape frame.

The conclusion should thus be that, in order to realize an error concealment by replacing an uncorrectable tapeframe by 'useful information', it is required to store 22 directly preceding frames and that an 'appropriate choice' is made from those 22 stored frames in order to obtain the 21 frames used for replacing the uncorrectable frames.

Figure 14:
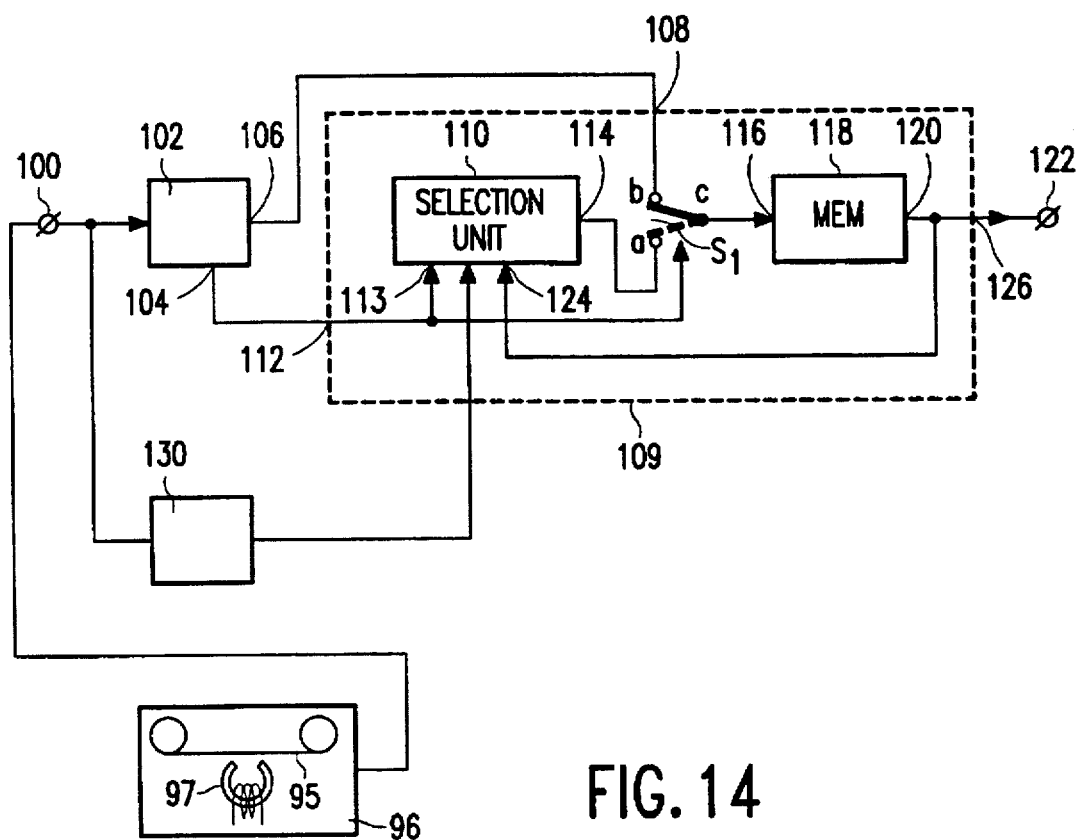
FIG. 14 shows an embodiment of the concealment arrangement.

FIG. 14 shows an embodiment of the concealment in accordance with the invention and included in a reproducing apparatus. The arrangement comprises an input terminal 100 for receiving the information signal as read out from the record carrier 95. To that purpose, the reproducing apparatus has reading means 96 including at least one read head 97 for reading the digital information signal from the record carrier 95. The arrangement may comprise an error correction unit 102 which carries out an error correction step on the signal read from the record carrier. More specifically, the error correction unit 102 carries out an error correction step on the signal block of information comprised in 21 subsequent frames. The error correction unit 102 is capable of generating a concealment flag in the case that the signal block of 21 subsequent frames cannot be corrected. This concealment flag is supplied to an output 104. The corrected information signal is supplied via an output 106 to an input 108 of a concealment unit 109. The concealment flag output 104 of the unit 102 is coupled to a concealment flag input 112 of the concealment unit 109. An output 126 of the concealment unit 109 is coupled to an output terminal 122 for supplying a concealed information signal. The concealment unit 109 comprises a memory 118. The input 108 of the concealment unit 109 is coupled to a terminal b of a switch $S_1$. A terminal c of the switch $S_1$ is coupled to an input 116 of a memory 118, an output 120 of which is coupled to the output 126, as well as to an input 124 of a selection unit 110. An output 114 of the selection unit 110 is coupled to a terminal a of the switch $S_1$. The switch $S_1$ is a controllable switch, whose switch position, either a–c or b–c can be controlled under the influence of the concealment flag supplied to the input 112. To that purpose, the input 112 is coupled to the switch for the supply of the concealment flag. Further, the input 112 is coupled to a concealment flag input 113 of the selection unit 110.

The switch $S_1$ is in its position b–c if no concealment flag is generated by the unit 102. As a result, error corrected information signal is supplied to the memory 118 for the storage of each time 22 subsequent frames in the memory. The memory 118 acts as a FIFO, so that the error corrected information signal is supplied to the output terminal 122.

If a concealment flag is generated for an uncorrectable tapeframe of 21 frames, the switch $S_1$ is switched into its position a–c. Further, under the influence of the concealment flag supplied to the input 113, the selection unit 110 receives the 22 subsequent frames stored in the memory 118 via the input 124, selects 20 or 21 frames from the 22 frames supplied to its input 124, and generates 21 frames from them for replacing the 21 frames of the uncorrectable tapeframe. Those 21 frames generated are supplied to its output 114 and supplied to the input 116 of the memory 118 via the switch $S_1$. The selection and generation is realized in the way as described with reference to the FIGS. 3 to 9, 9a, 10 to 13.

Figure 1:
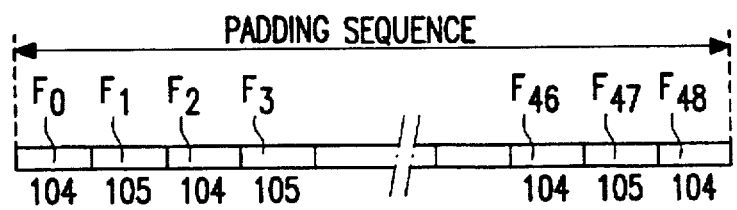
FIG. 1 shows the padding sequence occurring in the information signal.

To that purpose, the arrangement can comprise a detector unit 130 capable of detecting the sequence numbers of the frames comprised in the padding sequence of FIG. 1. As a result, the detector unit 130 can establish which frames are included in an uncorrectable tapeframe and need to be concealed. This can e.g. be established by establishing the sequence number of the first signal block of the uncorrectable tapeframe. When knowing the sequence number of the first signal block to be concealed, the selection unit knows which frames are stored in the memory 118, so that it is capable of generating 21 frames for replacing the frames to be concealed, by appropriately selecting 20 or 21 frames from the 22 frames stored in the memory 118.

We claim:

1. Arrangement for carrying out a concealment on an information signal, the information signal comprising subsequent signal blocks, each signal block comprising a sequence of alternate first frames (104) and second frames (105) of different lengths, expressed in numbers of bits, the number of first frames and second frames in a signal block being N1 (25) and N1–1 (24) respectively, where N1 is an integer number, the arrangement comprising an input terminal for receiving the information signal, concealment means having an input coupled to the input terminal and an output which is coupled to an output terminal for supplying the concealed information signal, the concealment means conceals the information in response to a concealment control signal, wherein the information includes a number of M (21) subsequent frames, M being an odd integer smaller than 2.N1–1, the concealment means comprising memory means for storing M+1 subsequent frames directly preceding the M subsequent frames to be concealed, that, in a situation where the M subsequent frames to be concealed comprise the last frame of a signal block and the first frame of a subsequent signal block, the concealment means are adapted to replace the M frames to be concealed by a group of M subsequent frames stored in the memory means, the said group of M subsequent frames used for replacement starting with a first frame.

2. Arrangement as claimed in claim 1, characterized in that in said situation where the M subsequent frames to be concealed comprise the last frame of a signal block and the first frame of a subsequent signal block, and where the M subband frames to be concealed start with a second frame, the concealment means are adapted to replace the M frames to be concealed by a group of M–1 subsequent frames stored in the memory means, plus one of the first frames stored in the memory, the group of M–1 subsequent frames used for replacement starting with a second frame.

3. Arrangement as claimed in claim 1, characterized in that, in a second situation where the M+1 subsequent frames stored in the memory means comprise the last frame of a signal block and the first frame of a subsequent signal block, the concealment means are adapted to replace the M frames to be concealed by a group of M subsequent frames stored in the memory means, if the M subsequent frames to be concealed comprise (M+1)/2 first frames and (M–1)/2 second frames.

4. Arrangement as claimed in claim 3, characterized in that in said second situation where the M+1 subsequent frames stored in the memory means comprise the last frame of a signal block and the first frame of a subsequent signal block, the concealment means are adapted to replace the M frames to be concealed by a group of M−1 subsequent frames stored in the memory means, plus one of the second frames stored in the memory, if the M subsequent frames to be concealed comprise (M−1)/2 first frames and (M+1)/2 second frames, the group of M−1 subsequent frames used for replacement starting with a second frame.

5. Arrangement as claimed in claim 3, characterized in that, in a third situation where neither the M subsequent frames to be concealed nor the M+1 subsequent frames stored in the memory means comprise both the last frame of a signal block and the first frame of a subsequent signal block, the concealment means are adapted to replace the M frames to be concealed by (i) a group of M subsequent frames stored in the memory means, if the M subsequent frames to be concealed comprise (M+1)/2 first frames and (M−1)/2 second frames, the group of the M subsequent frames used for replacement starting with a first frame, and by (ii) a group of M subsequent frames stored in the memory means, if the M subsequent frames to be concealed comprise (M−1)/2 first frames and (M+1)/2 second frames, the group of M subsequent frames used for replacement starting with a second frame.

6. Arrangement as claimed in claim 1, characterized in that, the arrangement comprises detection means for detecting a sequence number of a frame in a signal block and for detecting the sequence number of at least one frame in the M subsequent frames to be concealed, and for generating a first control signal in response to said detection so as to identify the first mentioned situation.

7. Arrangement as claimed in claim 6, characterized in that the detection means are further adapted to generate a second control signal in response to said detection so as to identify said first mentioned situation and to identify that the M subsequent frames to be concealed start with a second frame.

8. Arrangement as claimed in claim 3, characterized in that, the arrangement comprises detection means for detecting a sequence number of a frame in a signal block and for detecting the sequence number of at least one frame in the M subsequent frames to be concealed, and for generating a third control signal in response to said detection so as to identify the second situation and where the M subsequent frames to be concealed comprise (M+1)/2 first frames and (M−1)/2 second frames, a fourth control signal so as to identify the second situation and where the M subsequent frames to be concealed comprise (M−1)/2 first frames and (M+1)/2 second frames.

9. Arrangement as claimed in claim 5, characterized in that, the arrangement comprises detection means for detecting a sequence number of a frame in a signal block and for detecting the sequence number of at least one frame in the M subsequent frames to be concealed, and for generating a fifth control signal in response to said detection so as to identify the third situation and where the M subsequent frames to be concealed comprise (M+1)/2 first frames and (M−1)/2 second frames, a sixth control signal so as to identify the third situation and where the M subsequent frames to be concealed comprise (M−1)/2 first frames and (M+1)/2 second frames.

10. Arrangement as claimed in claim 1, characterized in that N1=25 and M=21.

11. Method for carrying out a concealment in the concealment arrangement as claimed in claim 1.

12. Reproducing apparatus for reproducing an information signal from at least one track on a record carrier, comprising the concealment arrangement as claimed in claim 1.

13. Arrangement as claimed in claim 2, characterized in that, in a second situation where the M+1 subsequent frames stored in the memory means comprise the last frame of a signal block and the first frame of a subsequent signal block, the concealment means are adapted to replace the M frames to be concealed by a group of M subsequent frames stored in the memory means, if the M subsequent frames to be concealed comprise (M+1)/2 first frames and (M−1)/2 second frames.

14. Arrangement as claimed in claim 2, characterized in that, the arrangement comprises detection means for detecting a sequence number of a frame in a signal block and for detecting the sequence number of at least one frame in the M subsequent frames to be concealed, and for generating a first control signal in response to said detection so as to identify the first mentioned situation.

15. Arrangement as claimed in claim 4, characterized in that, in a third situation where neither the M subsequent frames to be concealed nor the M+1 subsequent frames stored in the memory means comprise both the last frame of a signal block and the first frame of a subsequent signal block, the concealment means are adapted to replace the M frames to be concealed by (i) a group of M subsequent frames stored in the memory means, if the M subsequent frames to be concealed comprise (M+1)/2 first frames and (M−1)/2 second frames, the group of the M subsequent frames used for replacement starting with a first frame, and by (ii) a group of M subsequent frames stored in the memory means, if the M subsequent frames to be concealed comprise (M−1)/2 first frames and (M+1)/2 second frames, the group of M subsequent frames used for replacement starting with a second frame.

16. Arrangement as claimed in claim 4, characterized in that, the arrangement comprises detection means for detecting a sequence number of a frame in a signal block and for detecting the sequence number of at least one frame in the M subsequent frames to be concealed, and for generating a third control signal in response to said detection so as to identify the second situation and where the M subsequent frames to be concealed comprise (M+1)/2 first frames and (M−1)/2 second frames, a fourth control signal so as to identify the second situation and where the M subsequent frames to be concealed comprise (M−1)/2 first frames and (M+1)/2 second frames.

17. Reproducing apparatus for reproducing an information signal from at least one track on a record carrier, comprising the concealment arrangement as claimed in claim 2.

18. Reproducing apparatus for reproducing an information signal from at least one track on a record carrier, comprising the concealment arrangement as claimed in claim 3.

19. Reproducing apparatus for reproducing an information signal from at least one track on a record carrier, comprising the concealment arrangement as claimed in claim 6.

20. Reproducing apparatus for reproducing an information signal from at least one track on a record carrier, comprising the concealment arrangement as claimed in claim 10.

* * * * *